United States Patent [19]
Ehrlich

[11] 3,871,461
[45] Mar. 18, 1975

[54] STEERING DRIVE MECHANISMS

[76] Inventor: Josef Ehrlich, Bridgewater House, Ashridge near Berkhamstead, Hertfordshire, England

[22] Filed: Feb. 23, 1973

[21] Appl. No.: 335,334

[30] Foreign Application Priority Data
Feb. 25, 1972 United Kingdom .............. 8831/72

[52] U.S. Cl................ 180/6.2, 74/218, 74/242.15 R
[51] Int. Cl............................................. B62d 11/06
[58] Field of Search.................... 180/6.2, 6.66, 6.7; 74/218, 242.15 R, 722

[56] References Cited
UNITED STATES PATENTS

| | | |
|---|---|---|
| 1,236,749 | 8/1917 | Osser .................................... 74/218 |
| 2,813,433 | 11/1957 | Adams et al. ......................... 74/218 |
| 2,882,753 | 4/1959 | Pakosh ............................. 180/6.2 X |
| 3,235,019 | 2/1966 | Peterson ............................ 180/6.66 |
| 3,515,313 | 6/1970 | Siems ............................... 180/6.2 X |
| 3,595,332 | 7/1971 | Sanstrom ............................. 180/6.7 |
| 3,638,744 | 2/1972 | Washizawa .......................... 180/6.2 |
| 3,743,043 | 7/1973 | Gelinas ............................... 180/6.2 |

*Primary Examiner*—Robert J. Spar
*Assistant Examiner*—Leslie J. Paperner
*Attorney, Agent, or Firm*—Oblon, Fisher, Spivak, McClelland & Maier

[57] ABSTRACT

This invention is a drive mechanism for a vehicle which can be steered by left and right tracks or paddle wheels, there is an individual belt-and-pulley drive to each track or wheel, and a simple control enables the drive ratios to be changed in different senses for steering the vehicle.

11 Claims, 3 Drawing Figures

STEERING DRIVE MECHANISMS

This invention relates to a steering drive mechanism for example for driving a vehicle of the kind in which two tracks or sets of wheels or sets of paddle wheels are individually driven and the speeds at which they are driven can be regulated to steer the vehicle.

One object of the present invention is to provide a very simple drive mechanism of this kind which, in particular, will be simpler and cheaper than the complicated differential gear mechanisms which have been used for example in military tanks.

According to the present invention a steering drive mechanism includes a drive shaft or other input coupled to left and right device outputs through variable-ratio respective belt and pulley drives at least one of which is a variable-ratio drive, and a steering control arranged to change the relationship between the two drive ratios. If both are variable ratio drives the control can adjust them simultaneously, increasing one ratio and decreasing the other.

In one form of the invention each variable-ratio belt and pulley drive consists of two pulley wheels coupled by a belt, the distance between which wheels can be adjusted, and the belt being arranged automatically to adjust its position in accordance with the distance taken up. Thus to steer to the right the ratio of the left hand belt and pulley drive would be adjusted so that the left hand track or wheel runs faster while simultaneously the right hand drive would be adjusted so that the right hand wheel or track runs correspondingly slower and in this way turning about a very small radius can be achieved.

The two belt and pulley drives may each have one drive pulley on the drive shaft and one driven pulley coupled to the drive pulley through a belt, while mechanism can be arranged to adjust the distance of the driven pulleys from their respective drive pulleys simultaneously. For straight movement the two distances will be the same, while to steer, one driven pulley will be moved towards its drive pulley while the other is simultaneously moved away from its drive pulley. This can conveniently be achieved by means of a steering shaft carrying a pinion operating between two racks each of which is coupled through an appropriate link with a different one of the two driven pulleys.

The driven pulleys can be coupled to respective wheels or tracks which propel the vehicle through a belt or chain drive, the belt or chain length of which remains constant length, by mounting the driven pulley to move in an arc on a crank centred on the wheel that is to be driven.

The wheels can be provided with individual disc or other brakes which can be applied individually or together.

The drive shaft is conveniently driven from an engine through an automatic transmission so that the speed of the vehicle can be automatically controlled merely by use of a throttle pedal.

An optional feature of the invention is a reversing arrangement according to which both driven pulleys can be moved together towards their respective drive pulleys until they come into contact and can be driven by frictional contact between the rims in an appropriate direction for reverse movement.

Steering during reversing can be effected either by applying greater pressure between one pair of pulleys than between the other, or by selective use of the brakes, or both.

The invention may be carried into practice in various ways and one embodiment will be described by way of example with reference to the accompanying drawings, of which:

Figure 2:
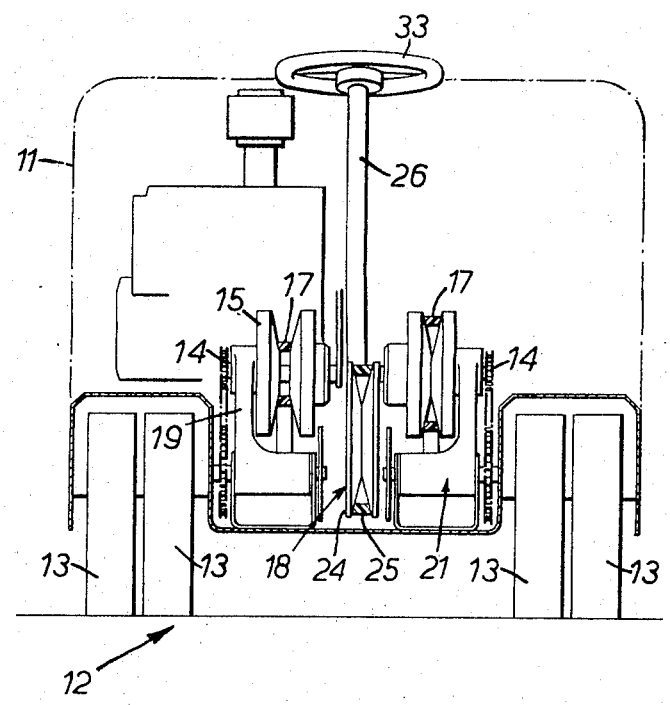
FIG. 2 is a front elevation.
Figure 3:
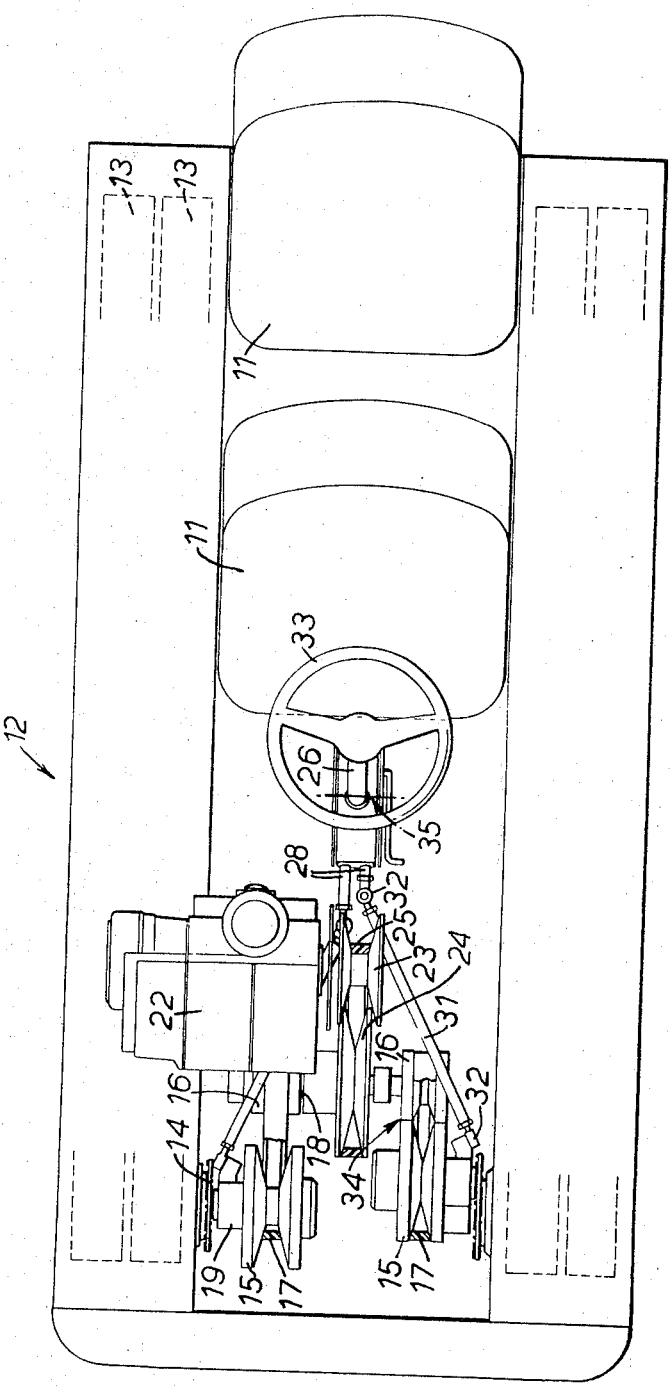
FIG. 3 is a plan view of the vehicle shown in FIG. 1.

The vehicle is shown as a two-seater having seats 11 for a driver and a passenger on a chassis arranged to be moved by left and right tracks 12, each consisting of two rubber belts 13 shown best in FIGS. 2 and 3.

The tracks 12 are driven through chain drives 14 from respective driven pulleys 15 each of which is one component of a variable-ratio belt and pulley drive consisting of a driven pulley 15, a drive pulley 16 and a Vee belt 17 interconnecting them. The two sides of the driven pulleys can move axially apart but are urged towards each other by helical compression springs whose ends are fixed angularly in relation to the respective pulley sides. This ensures that the belt automatically positions itself at an appropriate radius on the driven pulley dependent on the distance apart of the two pulleys. The Vee sides of the belt correspond with the inclined inside surfaces of the pulley sides.

Thus, as the distance between the pulleys increases, the belt tension increases, and the spring is compressed and unwinds a little, thereby turning the two sides of the pulley in relation to each other. Co-operating face cams on the opposed pulley faces cause the sides to move axially until the new belt tension is balanced by the spring resistance in the new position.

In FIGS. 2 and 3 the off-side driven pulley 15 is shown with its two sides at maximum separation and the belt 17 at minimum radius, while the near-side driven pulley 15 has the two sides in contact with each other and the belt 17 at maximum radius. Thus, the off-side driven pulley 15 is driven faster than the near-side driven pulley 15, since the two driving pulleys are on a common drive shaft 18.

The driven pulleys 15 are mounted on the upper end of respective cranks 19, pivoted at 21 concentrically with the drive wheel 20 for the respective track so that the chain 14 driving the track remains of constant length in spite of movement of the driven pulley 15 towards and away from the drive pulley 16 in an arc having its centre at 21.

The drive shaft 18 is driven from an engine 22 controlled by a foot throttle (not shown) through a Salsbury automatic belt transmission comprising a drive pulley 23, a driven pulley 24 and an interconnecting Vee belt 25.

The positions of the driven pulleys 15 and hence the speeds at which the two tracks 12 are driven is determined by a steering column 26 having at its lower end a pinion (not shown) between, and co-operating with, two racks 28 arranged so that as the steering column and the pinion are turned, one rack 28 is moved forwards while the other is moved backwards. Each rack is connected through a link 31 and ball-and-socket joints 32 to a boss 30 on one of the driven pulleys 15.

Thus, turning of a steering wheel 33 on the column 26 very simply speeds up one track and slows down the other to effect very precise steering about a radius which can be almost as small as desired so that the vehicle can effectively turn within its own width.

FIG. 3 shows that if both driven pulleys 15 are moved rearwardly they eventually come into contact at their rims with the respective drive pulleys 16 as indicated at 34 and in this situation the frictional drive between the two pulley wheels will be reversed from the direction when the belts 17 are used so that this makes a very simple reversing mechanism. The pulleys may have high friction linings on their edges for this purpose.

Figure 1:
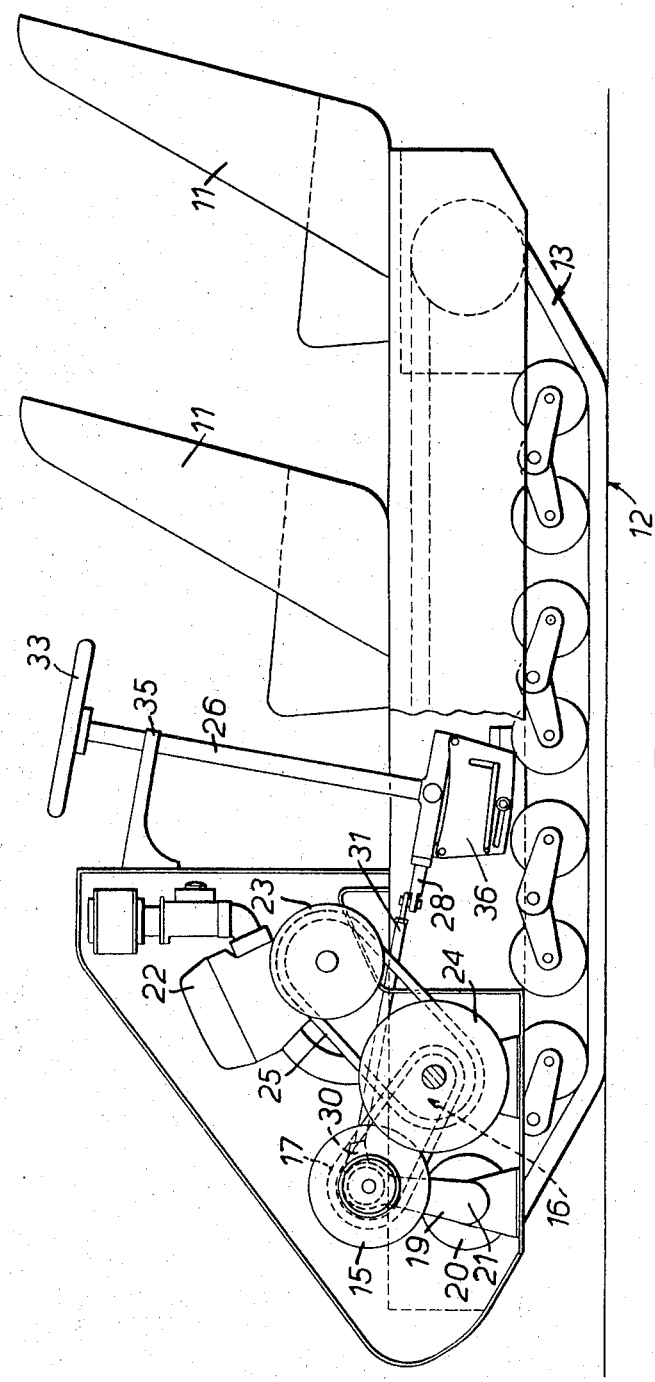
FIG. 1 is a side elevation of a track driven vehicle embodying the invention.

Reverse drive is engaged simply by pivoting the steering column about an axis shown at 35 in FIG. 1 so that the whole of the box supporting the racks and pinions pivots about a pin and slot connection indicated generally at 36 as the top of the steering column is pushed forwardly. Steering in the reverse direction can be achieved by sideways thrust on the steering column so that one driven pulley 15 is pressed against its drive pulley 16 more than the other, or if need be, steering in reverse can be assisted by selective application of one of a pair of disc brakes provided for the respective driving wheels.

It will be seen that the vehicle is very simple and so can be made quite cheaply. It can operate over rough terrain or snow and can cross ditches; one vehicle which has been made has achieved a maximum speed of 50 mph, and a minimum speed of 2½ mph, and can climb a gradient of 1:2½.

Although the drive has been described as adapted for a land vehicle driven by its tracks it is of course applicable to a vehicle having individually driven left and right wheels whether land wheels or paddle wheels for a boat, and indeed other applications of the steerable drive mechanism will come to mind.

What we claim as our invention and desire to secure by letters Patent is:

1. A drive mechanism comprising:
   a drive input;
   left and right drive output wheels;
   a first belt and pulley drive for said left drive output wheel;
   a second belt and pulley drive for said right drive output wheel;
   each of said first and second belt and pulley drives having a drive pulley coupled to said drive input, a driven pulley, a belt connecting said drive pulley and said driven pulley and drive coupling means for coupling said driven pulley to its respective output wheel;
   each of said driven pulleys being mounted on an arm radial of its respective output wheel;
   means for infinitely varying the drive ratio of at least one of said first and second belt and pulley drives; and
   steering control means for operation by a user to operate said infinitely variable ratio drive means by varying the distance of the driven pulley from the driving pulley in said at least one of said first and second belt and pulley drives, by a turning movement of said radial arm about the axis of the respective output wheel.

2. A mechanism as claimed in claim 1 including means for varying the drive ratio of the other of said first and second belt and pulley drives, and in which the steering control means operates both drive ratio-varying means simultaneously, increasing one ratio and decreasing the other.

3. A mechanism as claimed in claim 2 in which each of said means for varying the drive ratio of said first and second belt and pulley drives comprises means for adjusting the distance between said drive and driven pulleys thereof, and wherein said belts connecting said drive and driven pulleys are arranged to automatically adjust the position thereof on said driven pulleys in accordance with the distance being obtained between said drive and said driven pulleys.

4. A mechanism as claimed in claim 1, in which the steering control carries a pinion operating between two racks each of which is coupled through a link with a different one of said first and second belt and pulley drives.

5. A mechanism as claimed in claim 1, in which each output wheel is arranged for propelling a vehicle at one side.

6. A mechanism as claimed in claim 5 in which each output wheel has its individual brake.

7. A mechanism as claimed in claim 1 including an engine for driving the input and a speed control for the vehicle constituted by an engine throttle.

8. A mechanism as claimed in claim 7 including an automatically variable-ratio transmission between the engine and the drive input.

9. A mechanism as claimed in claim 1, in which the first and second belt and pulley drives include means for moving both driven pulleys thereof into frictional contact with their respective drive pulleys for establishing a reverse drive.

10. A mechanism as claimed in claim 9 including a control capable of applying greater pressure between one pair of pulleys during reverse drive than between the other pair of pulleys.

11. A mechanism as claimed in claim 1 wherein the drive pulleys of each of said first and second belt and pulley drives is on a common shaft constituting the drive input.

* * * * *